US009144062B2

(12) United States Patent
Chou et al.

(10) Patent No.: US 9,144,062 B2
(45) Date of Patent: Sep. 22, 2015

(54) METHOD AND APPARATUS OF ALLOCATING SCHEDULING REQUEST RESOURCES IN MOBILE COMMUNICATION NETWORKS (71) Applicant: MEDIATEK, INC., Hsin-Chu (TW)

(72) Inventors: Chie-Ming Chou, Taichung (TW); Chia-Chun Hsu, New Taipei (TW); Per Johan Mikael Johansson, Kungsangen (SE)

(73) Assignee: MEDIATEK INC. (TW)

( * ) Notice: Subject to any disclaimer, the term of this patent is extended or adjusted under 35 U.S.C. 154(b) by 182 days.

(21) Appl. No.: 13/848,942

(22) Filed: Mar. 22, 2013

(65) Prior Publication Data

US 2013/0250828 A1    Sep. 26, 2013

Related U.S. Application Data (60) Provisional application No. 61/615,041, filed on Mar. 23, 2012.

(51) Int. Cl.
H04W 72/04   (2009.01)
H04W 72/12   (2009.01)
H04L 5/00    (2006.01)

(52) U.S. Cl.
CPC ......... *H04W 72/0413* (2013.01); *H04L 5/0053* (2013.01); *H04L 5/0098* (2013.01); *H04W 72/1284* (2013.01); *H04L 5/0094* (2013.01)

(58) Field of Classification Search
None
See application file for complete search history.

(56) References Cited

U.S. PATENT DOCUMENTS 8,797,968 B2 *    8/2014   Bertrand et al. ............... 370/328
2009/0175159 A1 *  7/2009   Bertrand et al. ............... 370/203
(Continued)

FOREIGN PATENT DOCUMENTS

CN      101640905 A      7/2008
EP      2485556 A1       9/2009
(Continued)

OTHER PUBLICATIONS

International Search Report and Written Opinion of International Search Authority for PCT/CN2013/073052 dated Jul. 4, 2013 (10 pages).

(Continued)

*Primary Examiner* — Anh-Vu Ly
*Assistant Examiner* — Hashim Bhatti
(74) *Attorney, Agent, or Firm* — Imperium Patent Works; Zheng Jin (57) ABSTRACT Various schemes are provided to improve SR resource utilization by adapting SR resource allocation to traffic pattern. In a first Scheme, SR resource allocation is configured more accurately. In one example, UE provides assistant information for eNB to determine or adjust SR configuration based on the received assistant information. In a second Scheme, multiple SR periods are configured and adapted to traffic pattern. In one example, eNB configures a set of SR resources with multiple SR periods, and UE applies different SR periods based on predefined events. Unused SR resources could be recycled by eNB for PUSCH data transmission. In a third Scheme, multiple SR allocations are configured and adapted to concerned applications. In one example, eNB configures multiple sets of SR resources adapted to predefined applications, and UE applies SR configurations based on corresponding applications. The additional SR configurations could be activated and/or deactivated.

20 Claims, 8 Drawing Sheets

(56) References Cited

U.S. PATENT DOCUMENTS

| | | | |
|---|---|---|---|
| 2009/0303978 A1* | 12/2009 | Pajukoski et al. | 370/345 |
| 2011/0199991 A1 | 8/2011 | Harris et al. | 370/329 |
| 2011/0321050 A1 | 12/2011 | Ho et al. | 718/102 |
| 2012/0039278 A1* | 2/2012 | Park et al. | 370/329 |
| 2012/0113914 A1 | 5/2012 | Zhao et al. | 370/329 |
| 2012/0122465 A1* | 5/2012 | Landstrom et al. | 455/450 |
| 2012/0182908 A1* | 7/2012 | Pan et al. | 370/280 |
| 2012/0281566 A1* | 11/2012 | Pelletier et al. | 370/252 |
| 2012/0287877 A1* | 11/2012 | Han et al. | 370/329 |
| 2012/0307760 A1* | 12/2012 | Han et al. | 370/329 |
| 2013/0003678 A1* | 1/2013 | Quan et al. | 370/329 |
| 2013/0142166 A1* | 6/2013 | Bogineni et al. | 370/331 |
| 2013/0230033 A1* | 9/2013 | Lee et al. | 370/336 |

FOREIGN PATENT DOCUMENTS

| | | |
|---|---|---|
| WO | WO2011019903 A1 | 8/2009 |
| WO | WO2011038636 A1 | 9/2009 |

OTHER PUBLICATIONS

3GPP TSG-RAN WG2 Meeting #77bis, R2-121432, China Unicom, "Consideration on Improvement of SR Resource Utilization", Jeju Korea, Mar. 26-30, 2012 (2 pages).

EPO, Office Action for the EP patent application 13764412.6 dated Jul. 10, 2015 (6 pages).

* cited by examiner

Table 10.1.5-1: UE-specific SR periodicity and subframe offset configuration

| SR configuration Index $I_{SR}$ | SR periodicity (ms) $SR_{PERIODICITY}$ | SR subframe offset $N_{OFFSET,SR}$ |
|---|---|---|
| 0 – 4 | 5 | $I_{SR}$ |
| 5 – 14 | 10 | $I_{SR} - 5$ |
| 15 – 34 | 20 | $I_{SR} - 15$ |
| 35 – 74 | 40 | $I_{SR} - 35$ |
| 75 – 154 | 80 | $I_{SR} - 75$ |
| 155 – 156 | 2 | $I_{SR} - 155$ |
| 157 | 1 | $I_{SR} - 157$ |

METHOD AND APPARATUS OF ALLOCATING SCHEDULING REQUEST RESOURCES IN MOBILE COMMUNICATION NETWORKS

CROSS REFERENCE TO RELATED APPLICATIONS

This application claims priority under 35 U.S.C. §119 from U.S. Provisional Application No. 61/615,041, entitled "Method and Apparatus of Allocating Scheduling Request Resources," filed on Mar. 23, 2012, the subject matter of which is incorporated herein by reference.

TECHNICAL FIELD

The disclosed embodiments relate generally to mobile communication networks, and, more particularly, to allocating scheduling request resources to increase SR utilization while maintaining Quality of Service (QoS) requirement.

BACKGROUND

Long-term evolution (LTE) system, which offers high peak data rates, low latency and improved system capacity, is adopted by many operators. In the LTE system, an evolved universal terrestrial radio access network (E-UTRAN) includes a plurality of evolved Node-Bs (eNodeBs) communicating with a plurality of mobile stations, referred as user equipment (UE), via LTE-Uu interface. The radio access network further connects with a core network (CN), which includes Mobility Management Entity (MME), Serving Gateway (S-GW), and Packet data Network Gateway (P-GW), to provide end-to-end services. While LTE network increases system capacity, it is projected that LTE network may soon face capacity problems. The exponential growth of mobile subscribers requires substantial increase of network capacity. Concurrent with this problem of rapid growth of number of users, there has been a rapid uptake of Smartphone subscribers, such as iPhone, Android phone and Blackberry phone users.

Many Smartphone applications such as news, weather, and social networking, periodically connect and disconnect to/from the network for updates. These applications contain small amount of user data while still require a large amount of signaling traffic to establish and tear down the session. Consequently, the core network tends to keep UEs connected under Smartphone applications. Under diverse data application (DDA) (background/IM) environment, it is very likely to keep a UE in RRC connected mode to prevent RRC transition. Less RRC transition could have similar power saving performance if discontinuous reception (DRX) is properly configured.

However, the radio resource utilization for physical uplink control channel (PUCCH) will be a problem when the number of connected UEs increases, especially on scheduling request (SR) resources allocated in PUCCH. This is because the SR resources are dedicate and periodic, hence SR resource wastage would increase linearly as the number of connected UEs increases. For example, with a bandwidth of 10 MHz (50 physical resource blocks (PRBs)), if 300 UEs are all kept connected, then the PUCCH allocation needs 8 PRBs when SR period is 5 ms. Among the 8 PRBs, the utilization (being used resources) of SR is only 0.04% under background traffic. Even when SR period is extended from 5 ms to 80 ms, the SR resource utilization is 0.67% only. In addition, while it is straightforward to use a longer SR period to increase utilization, such allocation will increase access delay extremely. If more resources are reserved for SR, then less resources would be available for uplink data transmission via physical uplink shared channel (PUSCH) and decrease uplink capacity. Therefore, when traffic becomes more diverse, traditional unified SR resource allocation scheme may not be enough or may not be efficient to satisfy network and UE requirement.

It is an objective of the current invention to increase the SR resource utilization and to maintain QoS as well. A solution is sought.

SUMMARY

Scheduling Request (SR) resources in PUCCH are allocated by base station for UE to transmit SR indication for uplink data. SR resources are dedicated and periodic. Various schemes are provided in the present invention to improve SR resource utilization by adapting SR resource allocation to traffic pattern.

In a first Scheme, SR resource allocation is configured more accurately based on assistant information provided by the UE. UE provides assistant information for eNB to determine or adjust SR configuration based on the received assistant information. The SR configuration comprises an SR configuration index associated with an SR period and an SR offset. In one example, the assistant information comprises a UE-preferred SR configuration index. In another example, the assistant information comprises UE-preferred SR period/offset, and/or traffic pattern information related to packet inter-arrival time (IAT). Because UE provides assistant information based on considerations such as QoS requirement, traffic pattern statistics, and DRX configuration, eNB is able to allocate SR resources more accurately. UE may further send request message to release SR allocation.

In a second Scheme, multiple SR periods are configured and adapted to traffic pattern. The base station configures a set of SR resources with multiple SR periods, and UE applies different SR periods based on predefined triggering events. In one example, the triggering event is based on an SR timer that is configured via the SR configuration. In another embodiment, the triggering condition is satisfied when uplink data for a specific application is sent to the base station. The triggering condition may also be based on a discontinuous reception (DRX) operation status. In one advantageous aspect, unused SR resources in PUCCH can be recycled for other UEs or for PUSCH data transmission. By configuring SR resources with different SR periods, SR resource usage is adapted to traffic pattern.

In a third Scheme, multiple SR allocations are configured and adapted to concerned applications. The base station configures multiple sets of SR resources adapted to predefined applications, and UE applies SR configurations based on corresponding applications. The multiple pre-allocated SR resources are determined to satisfy quality of service (QoS) requirement of the applications. In one embodiment, the allocated SR radio resources are activated or deactivated based on start and/or stop of application. With multiple pre-allocated SR allocations, SR resource usage is adapted to concerned applications.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
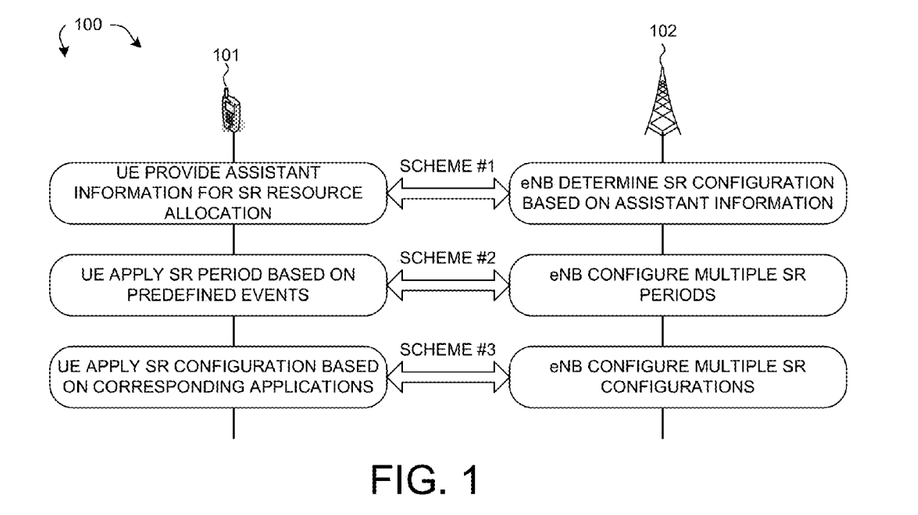
FIG. 1 illustrates several schemes of improving SR resource utilization in a wireless communication system in accordance with one novel aspect.

FIG. 1 illustrates several schemes of improving scheduling request (SR) resource utilization in a wireless communication system 100 in accordance with one novel aspect. Wireless communication system 100 comprises a user equipment UE 101 and a base station eNB 102. In LTE systems, a physical uplink shared channel (PUSCH) is used to carry uplink data from UE 101 to eNB 102, and a physical uplink control channel (PUCCH) is used to carry various uplink control information such as an automatic repeat request (ARQ) or a hybrid ARQ (HARQ) in response to downlink transmission, a scheduling request (SR), and channel quality indication (CQI) reports. When UE 101 has uplink data to be transmitted to eNB 102, UE 101 sends an SR indication via allocated SR resources in PUCCH to eNB 102, and in response receives an uplink grant from eNB 102 such that the uplink data can be transmitted from UE 101 to eNB 102 via PUSCH.

Under diverse data application (DDA) (background/IM) environment, it is very likely to keep a UE in radio resource control (RRC) Connected mode to prevent RRC transition. Less RRC transition could have similar power saving performance if discontinuous reception (DRX) is properly configured. However, the allocated SR resources in PUCCH are dedicated to each UE in RRC Connected mode and periodic. As a result, wastage of SR resources would increase linearly as the number of UEs in RRC Connected mode increases. Even with long SR period configuration (e.g., SR period=80 ms), the SR resource usage ratio is still very low (e.g., 0.67%) when most UEs are kept in RRC Connected mode. In addition, longer SR period would extremely increase access delay.

In one novel aspect, various schemes are provided to improve the SR resource utilization by adapting SR resource allocation to traffic pattern. As illustrated in FIG. 1, in a first Scheme #1, SR resource allocation is configured more accurately. For example, UE 101 provides assistant information, and eNB 102 determines or adjusts SR configuration based on the received assistant information. In a second Scheme #2, SR period is adapted to traffic pattern. For example, eNB 102 configures a set of SR resources with multiple SR periods, and UE 101 applies different SR periods based on predefined events. Unused SR resources could be recycled by eNB 102 for PUSCH data transmission. In a third Scheme #3, multiple SR allocations are adapted to concerned applications. For example, eNB 102 configures multiple sets of SR resources adapted to predefined applications, and UE 101 applies SR configurations based on corresponding applications. The additional SR configurations could be activated and/or deactivated based on start and/or stop of the corresponding applications.

Figure 2:
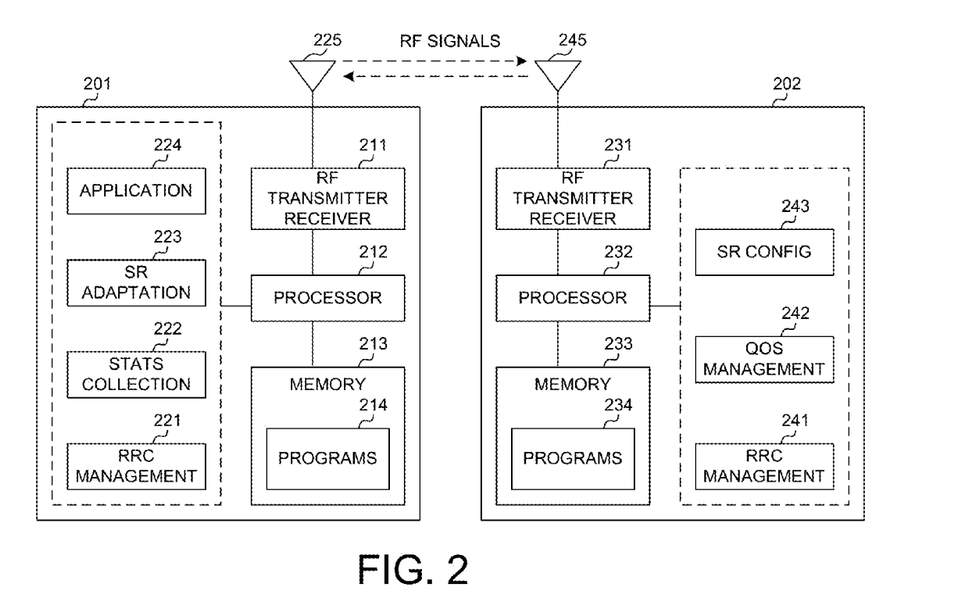
FIG. 2 is a simplified block diagram of a UE and an eNB that support certain embodiments of the present invention.

FIG. 2 is a simplified block diagram of a UE 201 and an eNB 202 that support certain embodiments of the present invention. Antenna 225 transmits and receives RF signals. RF transceiver module 211, coupled with antenna 225, receives RF signals from the antenna, converts them to baseband signals and sends them to processor 212. RF transceiver 211 also converts received baseband signals from the processor 212, converts them to RF signals, and sends out to antenna 225. Processor 212 processes the received baseband signals and invokes different functional modules to perform features in UE 201. Memory 213 stores program instructions and data 214 to control the operations of UE 201.

Similar configuration exists in eNB 202 where an antenna 245 transmits and receives RF signals. RF transceiver module 231, coupled with antenna 245, receives RF signals from the antenna, converts them to baseband signals and sends them to a processor 232. RF transceiver 231 also converts received baseband signals from the processor 232, converts them to RF signals, and sends out to antenna 245. Processor 232 processes the received baseband signals and invokes different functional modules to perform features in eNB 202. Memory 233 stores program instructions and data 234 to control the operations of eNB 202.

FIG. 2 also shows functional modules of UE 201 and eNB 202, which carry out embodiments of the present invention. For example, RRC management modules 221 and 241 manage RRC states, perform RRC connection setup, and maintain RRC connection for RRC signaling. Stats collection module 222 collects traffic statistics of various traffic patterns associated with different applications. SR adaptation module 223 receives SR configuration from eNB 202 (via SR Configuration module 243) and adapts to the SR configuration when necessary. Application module 224 manages various applications running on UE 201. The different functional modules can be implemented by software, firmware, hardware, or any combination thereof. For example, the function modules, when executed by the processors 212 and 232 (e.g., via executing program codes 214 and 234), allow UE 201 to collect and provide traffic statistics as assistant information to eNB 202, allow eNB 202 to configure SR resource allocation based on the received assistant information, and also based on QoS requirement (via QoS management module 242), and allow UE 201 to apply and adapt to the SR configuration accordingly to improve SR resource utilization while maintaining QoS.

Figure 3:
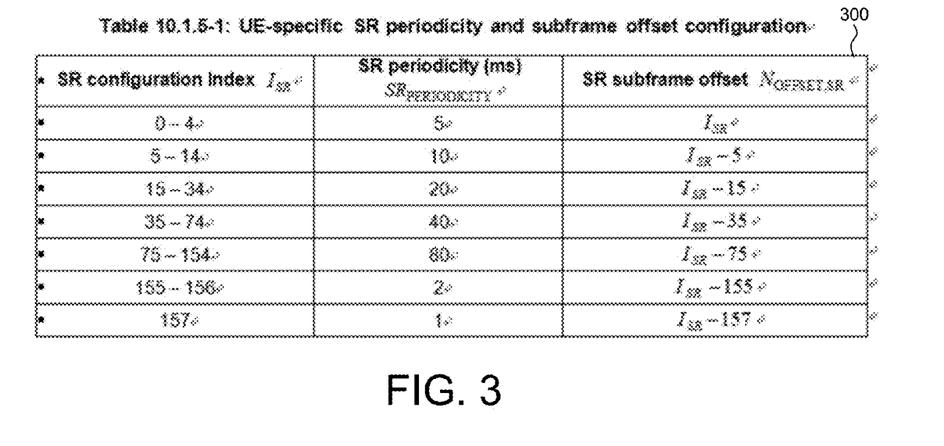
FIG. 3 illustrates an SR configuration index associated with SR period and SR offset.

FIG. 3 illustrates an SR configuration index associated with SR period and SR offset. In LTE systems, an information element (IE) SchedulingRequestConfig is used to specify SR parameters including an SR periodicity and an SR subframe offset, which are associated with corresponding SR configuration index. As illustrate by table 300 in FIG. 3, the SR configuration for SR transmission periodicity $SR_{PERIODICITY}$ and SR subframe offset $N_{OFFSET}$ is defined in Table 300 by the parameter sr-ConfigIndex and $I_{SR}$ given by higher layers. The SR configuration index ranges from 0-157, each index corresponds to an SR periodicity (e.g., $SR_{PERIODICITY}$ from 1 ms to 80 ms) and an SR subframe offset (e.g., $N_{OFFSET}$, where $I_{SR}$ given by higher layers). SR transmission instances are the uplink subframes satisfying:

$$(10 \times Nf + \lfloor Ns/2 \rfloor) \bmod SR_{PERIODICITY} = 0$$

Where
Nf is the system frame number
Ns is the slot number

Traditionally, eNB assigns SR configuration based on QoS requirement, but the QoS requirement received from the Core network may not be enough for eNB to decide the best solution for SR resource allocation. Input from UE can facilitate better SR configuration. For example, UE can avoid eNB allocating short SR period for traffic with long packet inter-arrival-time (IAT), and UE can help eNB more accurately align SR offset with the timing that uplink data enters Layer two (L2) buffer. In one novel aspect, according to traffic pattern and UE intelligence, UE may feedback its preferred sr-ConfigIndex to eNB, especially on the SR offset.

Figure 4:
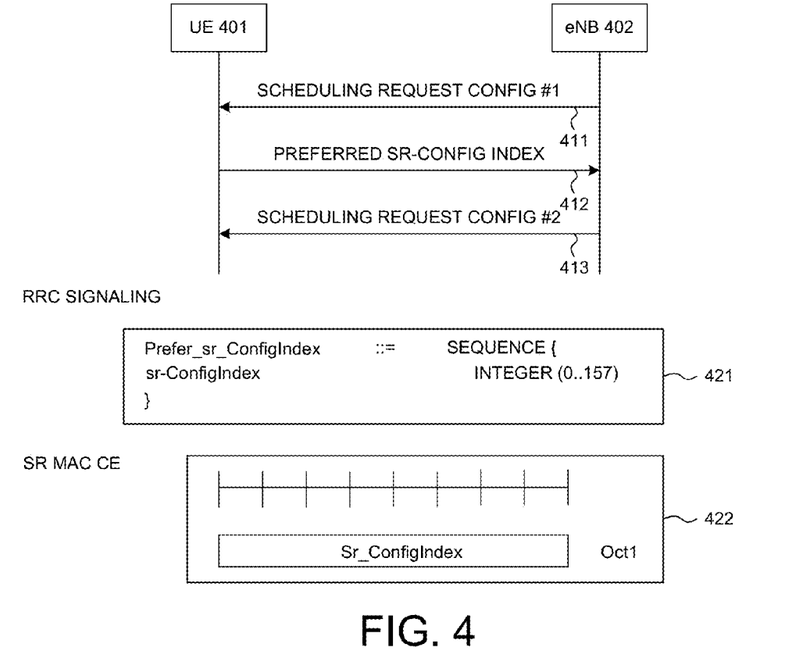
FIG. 4 illustrates a first embodiment of providing preferred SR configuration index from UE to eNB.

FIG. 4 illustrates a first embodiment of providing preferred SR configuration index from UE to eNB. In step 411, UE 401 receives a first SR configuration #1 from eNB 402. The first SR configuration contains a first sr-ConfigIndex associated with an SR period and an SR offset. However, such SR configuration may not be preferred by UE 401. For example, UE 401 may evaluate the SR usage and find a poor utilization; consequently UE 401 could initiate the feedback. UE 401 may decide the appropriate periodicity and offset of SR, following a list of criteria. First, UE 401 may consider the QoS requirement of the running applications. Second, UE 401 may consider the traffic pattern history to predict the timing of user data entering L2 buffer. Third, UE 401 may consider its DRX configuration, e.g., SR resources could be allocated in or slightly ahead of the On Duration of DRC operation. DRX configuration has the benefit to reduce UE Active Time and therefore saves UE power consumption, but also incurs longer delay. It would be preferred to align SR periodicity with DRX cycles. For example, the value range of SR period is: 1, 2, 5, 10, 20, 40, and 80, and the value range of short DRX cycle is: 2, 5, 8, 10, 16, 20, 32, 40, 64, 80, 128, 160, 256, 320, 512, and 640. It would be preferred if the SR configuration satisfies: DRX cycle=n*SR period. After such decision making, in step 412, UE 401 sends its preferred sr-ConfigIndex to eNB 402. The preferred sr-ConfigIndex may be sent via an RRC signaling message (e.g., depicted by box 421) or via a media access control (MAC) control element (CE) (e.g., depicted by box 422). After receiving UE's preference, eNB 402 may consider current PUCCH loading and available resources, and then decide whether to adjust the SR configuration. If so, in step 413, eNB 402 sends a second SR configuration #2 to UE 401 to adjust SR configuration. Alternatively, eNB 402 may reject the suggestion by ignoring or sending a reject message explicitly.

In addition to sending preferred SR configuration index, UE may report other assistant information to eNB to improve the accuracy of configuring SR resources. There are different types of assistant information. In general, information on UL packet inter-arrival time (IAT) is very useful. Such information may be represented by a cumulative distribution function (CDF) curve or a probability density function (PDF) diagram of packet inter-arrival time, which is the time difference between two neighboring packets. For example, a CDF curve by a sequence of points (probability vs. IAT) or by a sequence of slopes, and a CDF for IAT of user data entering L2 buffer may be used.

Figure 5:
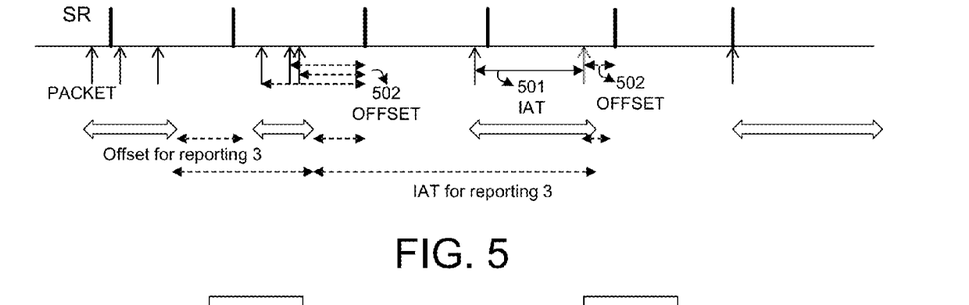
FIG. 5 illustrates a traffic pattern and related parameters associated with SR resource allocation.

FIG. 5 illustrates a traffic pattern and related parameters associated with SR resource allocation. In the example of FIG. 5, the arrowed line 501 indicates an IAT values for UL packets, while dashed arrowed lines 502 indicate various waiting times to the next SR opportunity after user data enters L2 buffer. Note that sometimes Uplink Shaping may be used to reduce the wake up of the scheduling request. The idea is that UE may aggregate multiple uplink packets and make one scheduling request. For example, in FIG. 5, the UE aggregates three continuous packets and makes one SR. Under this case, while doing statistics on SR period and offset, UE may group them together and use the latest one packet to calculate the offset (e.g., Offset for reporting 3) and SR period (e.g., IAT for reporting 3). It can be seen that an average IAT value would be very useful for determining SR periodicity, while an average waiting time would be very useful for adjusting SR offset.

Figure 6:
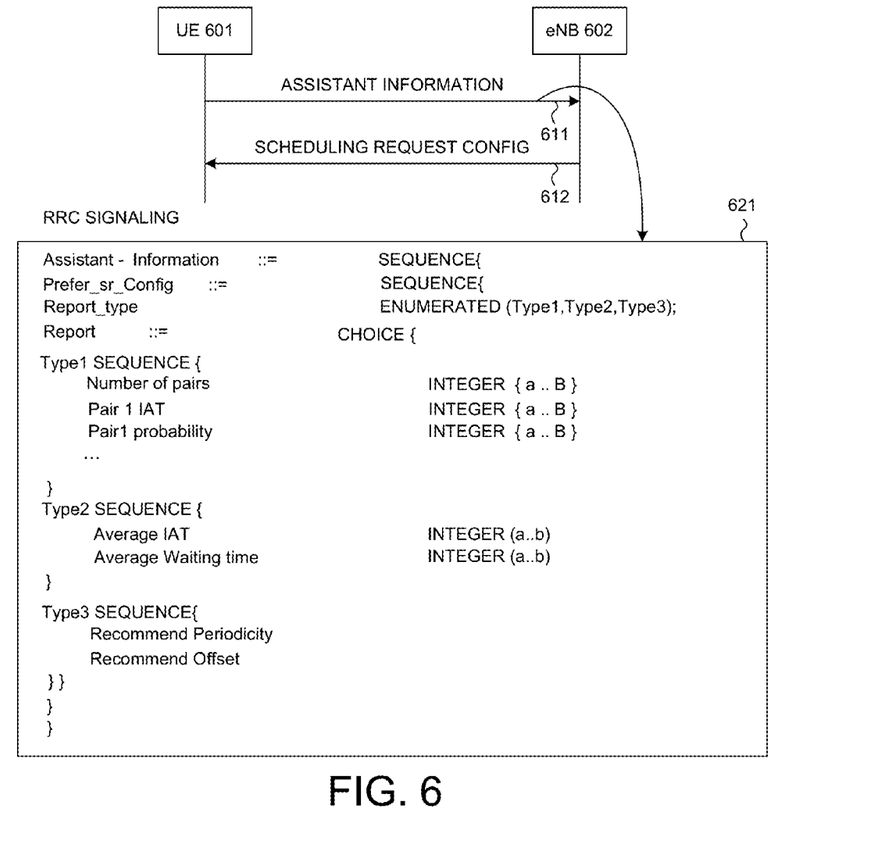
FIG. 6 illustrates a second embodiment of providing assistant information from UE to eNB for SR resource allocation.

FIG. 6 illustrates a second embodiment of providing assistant information from UE to eNB for SR resource allocation. In step 611, UE 601 sends assistant information to eNB 602. The assistant information may be sent via RRC signaling as depicted by box 621. For example, the assistant information may be reported in three types. In a first report type, a sequence of pairs are reported, each pair consists of an IAT value and a probability. In a second report type, both average IAT and average waiting time are reported. In a third report type, a recommended SR period (based on average IAT) and a recommended SR offset (based on average waiting time) are reported. Note that the recommended SR period may be different from the average IAT. For example, UE 601 may perform UL traffic shaping by delaying not urgent UL packets and only send SR indication according to pre-defined criteria. In addition, the recommended SR offset may not be the average waiting time that user data enters L2 buffer. Instead, it could be the result after UL traffic shaping is applied.

For certain traffic, UL access via random access SR (RA-SR) may be more efficient (regarding delay and resource utilization) than via dedicated SR (D-SR). However, current LTE specification prevents a UE to perform RA-SR if D-SR is configured. A mechanism to release D-SR resources is thus desirable when there is such a need. By inserting an indication into the assistant information provided by the UE, the indication could tell eNB UE's intention to release SR resources. In the first embodiment with respect to FIG. 4, UE 401 indicates a specific value (e.g., 158 which is unused for sr-ConfigIndex) in preferred sr-ConfigIndex, then eNB 402 interprets it as an indication to request releasing the SR resources. In the second embodiment with respect to FIG. 6, UE 601 indicates a specific value (e.g., 0) for average or recommended IAT value, then eNB 602 interprets it as an indication to request releasing the SR resources.

The existing SR configuration and assistant information may be useful for handover (HO) operation and RRC connection reestablishment. During HO, source eNB may pass related SR configuration or assistant information to target eNB, and the target eNB can use it for SR configuration. Once UE is released to RRC Idle mode, eNB may forward SR configuration or assistant information to Mobility Management Entity (MME) or neighbor cells. Later, when UE send RRC connection reestablishment request in a cell, the cell either already has the information or can get the information from MME.

In the above-illustrated method (e.g., Scheme #1 in FIG. 1), eNB is able to allocate SR resources more accurately based on UE's feedback. However, since traffic pattern is changing, a mechanism is need to adapt SR configuration dynamically. In current LTE specification, there is no mechanism for SR to adapt other than RRC re-configuration. UE would release PUCCH resources for SR only when TAT expires. Normally, TAT is configured based cell size or UE speed. If TAT is long, then UE stays in UL sync and keeps the allocated PUCCH resources. UE could keep sending assistant information to eNB to improve SR utilization. However, such mechanism increases signaling overhead with the frequency of update. Frequent RRC reconfiguration and assistant information cost extra signaling overhead. Autonomous adaptation at the UE side may avoid the signaling overhead problem.

In one novel aspect (e.g., Scheme #2 in FIG. 1), SR period is adapted to traffic pattern autonomously without increasing signaling overhead. Because background traffic and normal traffic may have different inter-arrival time, an SR allocation scheme with adaptive SR periods improves efficiency of SR if SR is adapted to the traffic of running applications. In general, eNB can configure a set of SR resources with multiple SR periods, one SR period is longer than the other. In one alternative, UE would apply one of the configuration and then switch between the two configurations according to pre-defined events. In another alternative, UE would use both of the configurations, and the ON/OFF of the configurations is based on pre-defined events. In all cases, eNB and UE must be in-sync, e.g., eNB must know whether PUCCH resources would be used by the UE.

Figure 7:
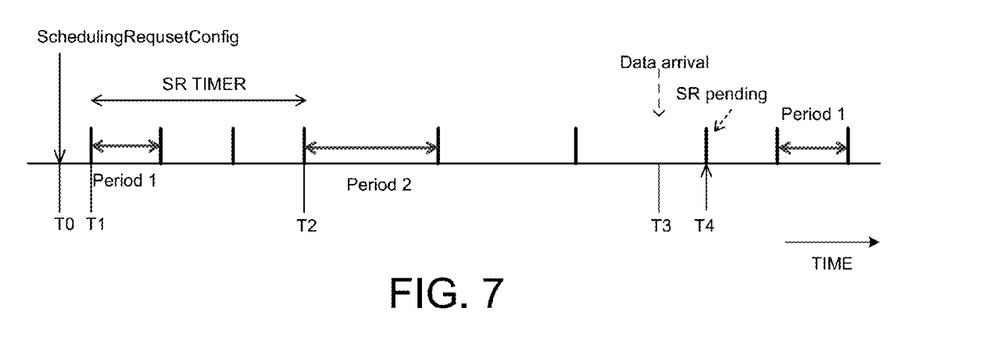
FIG. 7 illustrates an SR configuration with two different SR periods.

FIG. 7 illustrates an SR configuration with two different SR periods for adaptation. In the example of FIG. 7, a base station sends an SR configuration that allocates a set of physical radio resources in the PUCCH for a UE (at time T0). The SR configuration configures two SR periods (Period #1 and Period #2). The SR configuration also contains an SR Timer that is used for the switching between the two configured SR periods. The first SR resource occurs at time T1, and periodically occurs thereafter in accordance with the first configured SR period of Period #1. If the UE has no uplink data to be transmitted, then the SR Timer expires at time T2. Upon the expiration of the SR Timer, eNB switches to the second configured SR period, which means subsequent SR resources periodically occur thereafter with SR period of Period #2. At time T3, UL data enters L2 buffer, and UE sends an SR indication to eNB at time T4. Upon such event, the eNB switches back to the first configured SR period with Period #1, and so on so forth.

Figure 8:
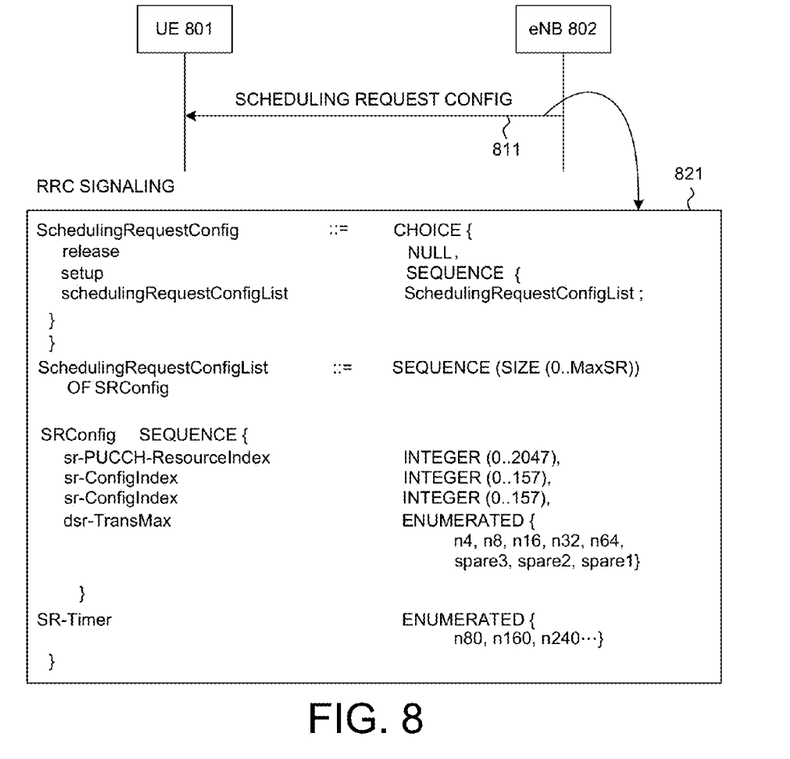
FIG. 8 illustrates a method of adaptive SR configuration.

FIG. 8 illustrates a method of adaptive SR configuration. In step 811, UE 801 receives an SR configuration from eNB 802. The SR configuration may be sent via RRC signaling as depicted by box 821. For example, the SR configuration allocates a set of physical radio resources in PUCCH based on sr-PUCCH-ResourceIndex. The SR configuration also contains two sr-ConfigIndex, each is associated with an SR period and an SR offset. In addition, the SR configuration contains an SR-Timer. The SR-Timer is used to indicate how long an SR configuration is valid, and is restarted upon SR transmission. When the first one SR configuration become invalid, the second one SR configuration becomes valid alternatively. In another example, the switching between the two SR periods happens upon UL data for a specific application is received by eNB. The specific application may be indicated by sending a power preference indication (PPI) to the base station. By configuring two different SR periods and an SR-Timer, adaptive SR configuration is achieved to adapt to different traffic types without extra signaling exchanged between eNB 802 and UE 801.

Besides using a timer or data arrival as a trigger for switching between different SR configurations, DRX transition state can also be used. In a first example, transition between Active state and DRX state can be used for the switching between SR configurations. During Active time (either inactivity timer or onDuration timer is running), a first set of SR configuration is applied. Once UE enters DRX, a second set of SR configuration is applied. In a second example, transition between short DRX cycle and long SRX cycle is used for the switching between SR configurations. When short DRX cycle is used, a first set of SR configuration is applied. When long DRX cycle is used, a second set of SR configuration is applied. In both examples, DRX state transition is used to achieve adapting SR configuration to traffic patterns autonomously without incur signaling overhead. It is noted that using a timer or a data arrival or a DRX transition for SR adaption could be asymmetric. For example, long SR period switches to short SR period could rely on timer control, but short SR period switches to long period could rely on a change of DRX cycle.

In one embodiment, the multiple SR configurations could be suggested by UE. For example, when UE report assistant information, UE may suggest at least two preferred SR configurations to help eNB determining the multiple SR configurations for adaptation.

Figure 9:
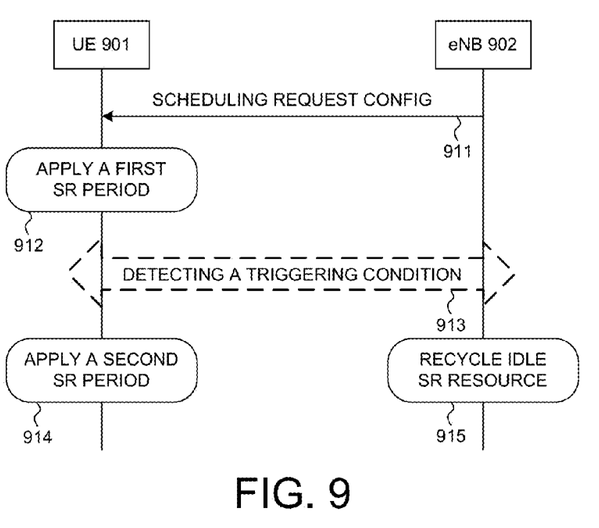
FIG. 9 illustrates a method of adaptive SR configuration with SR resource recycling.

FIG. 9 illustrates a method of adaptive SR configuration with SR resource recycling. In step 911, UE 901 receives a scheduling request configuration from eNB 902. The SR configuration allocates a set of resources for SR transmission with two different configured SR periods. In step 912, UE 901 applies a first SR period for transmitting SR indication. In step 913, a triggering event is detected by UE 901. The triggering condition is predefined (e.g., an SR Timer) between UE 901 and eNB 902 such that they are always in sync. In step 914, UE 901 starts to apply a second SR period for transmitting SR indication. If the second SR period is longer than the first SR period, then the allocated SR resources are not fully used. To improve resource utilization, in step 915, eNB 902 recycles the unused SR resources. The unused SR resources dedicated for UE 901 can be re-allocated to other UEs as PUCCH resources, or re-allocated to UEs for data transmission as PUSCH resources.

Figure 10:
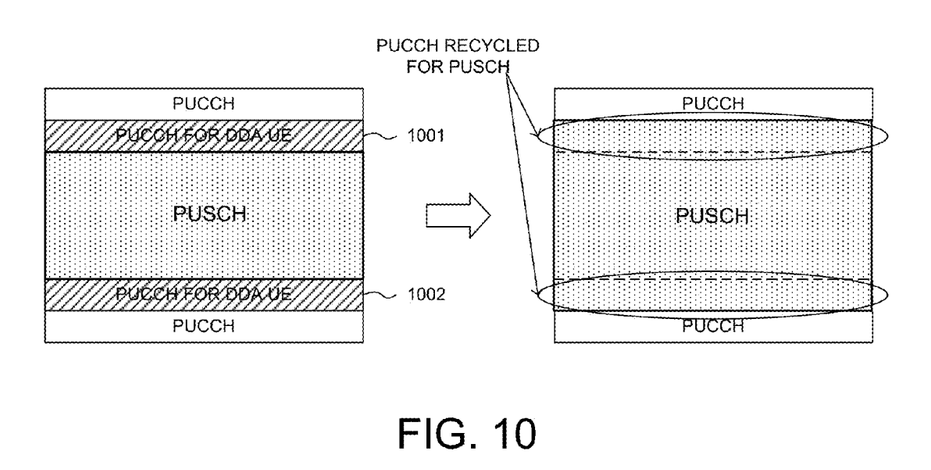
FIG. 10 illustrates a virtual PUCCH that can be used for PUSCH data transmission.

FIG. 10 illustrates a virtual PUCCH that can be used for PUSCH data transmission. During adaptive SR configuration, the unused SR resources in PUCCH may be recycled for PUSCH. Typically, eNB can update PUCCH configuration with RRC signaling based on indication from UE. However, this may incur extra signaling overhead for transmitting RRC reconfiguration and SR configuration from eNB to UE if the traffic pattern changes dynamically and frequency update is required. To limit the overhead, a virtual PUCCH concept is used to recycle the already allocated PUCCH resources. Virtual PUCCH means that a subset of the allocated PUCCH resources would be invalid when indicated by eNB. The indication can be implicit or explicit. As illustrated in FIG. 10, PUCCHs for DDA UEs are allocated in a region that is closer to the PUSCH region. For example, PUCCH region 1001 and PUCCH region 1002 are allocated for DDA UEs for SR transmission. In one example, when the SR periodicity is changed to N times upon indication from eNB, then the allocated PUCCH regions are recycled for PUSCH. N can be a predefined number and the indication can be implicit or explicit.

Different applications may have different QoS requirement (e.g., delay, jitter, dropping rate), a traditional unified SR configuration could either only meet the need of a subset of the applications, or have problem with efficiency/utilization. Therefore, if multiple SR configurations could be allocated with respect to different applications, then PUCCH performance or efficiency can be improved. If UE can have multiple SR resources, then the SR usage can be adapted to concerned applications. Instead of using a general SR for traffic from all applications, individual SR can be used by only one or a subset of applications. The additional SR configuration can be activated or deactivated.

Figure 11:
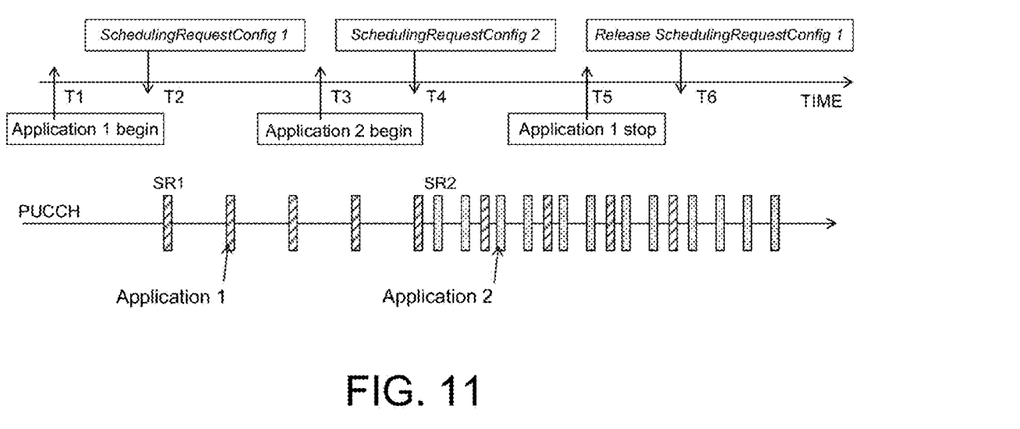
FIG. 11 illustrates different SR configurations correspond to different applications.

FIG. 11 illustrates an example of different SR configurations correspond to different applications. At time T1, application 1 starts running. At time T2, eNB configures a first SR configuration, and UE is allocated with resources SR1 in PUCCH for SR indication. At time T3, application 2 starts running. At time T4, eNB configures a second SR configuration and UE is allocated with resources SR2 in PUCCH for SR indication. Note that both SR1 and SR2 resources are allocated to UE in the same TTI (transmit time interval). In this TTI, considering UE transmission power on PUCCH, UE could choose one of the SR to make request and further report the information (which application and its size) in the later signaling. At time T5, application 1 stops running. At time T6, eNB releases the first allocated SR resources, so only SR2 is allocated to UE.

Figure 12:
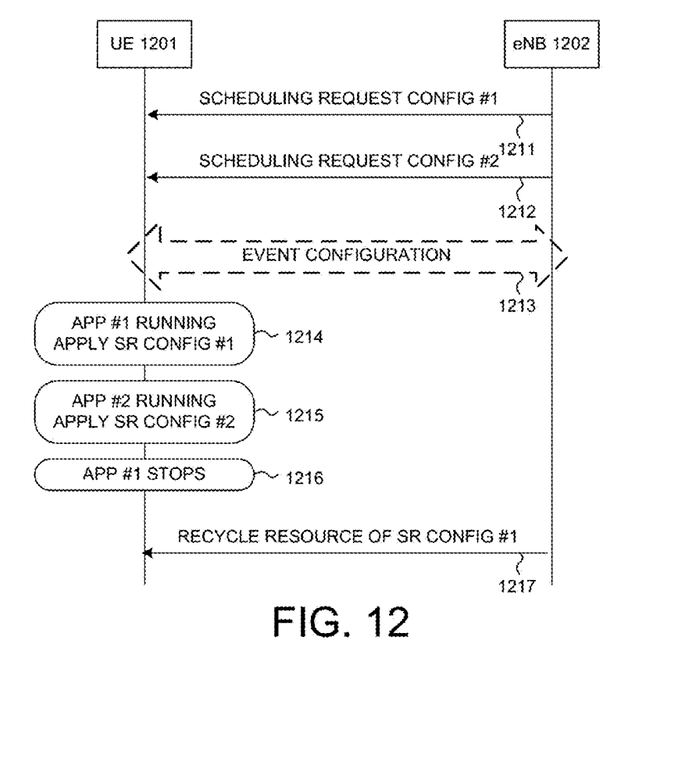
FIG. 12 illustrates a method of configuring multiple SR configurations for predefined applications.

FIG. 12 illustrates a method of configuring multiple SR configurations for predefined applications. In step 1211, UE 1201 receives a first SR configuration #1 from eNB 1202 that allocates a first set of SR resources. In step 1212, UE 1201 receives a second SR configuration #2 from eNB 1202 that allocates a second set of SR resources. In step 1213, eNB 1202 communicates a set of predefined events to UE 1201, the predefined events are associated with the pre-allocated SR resources such that the usage of the SR resources can be controlled by the predefined events. For example, each pre-allocated SR resources can be associated with one or more set of predefined applications based on the QoS requirement of the applications. In step 1214, UE 1201 starts running application #1, and uses the first set of SR resources to meet associating QoS requirement. In step 1215, UE 1201 starts running application #2 and uses the second set of SR resources. In step 1216, application #1 stops running, and UE 1201 stops using the first set of resources. In step 1217, eNB 1202 recycles the unused first set of SR resources for other usage.

The start and stop of the using set of resources can be automatically controlled by traffic or pre-defined (application ON/OFF, and UE/eNB in-sync the SR usage by identifying the respective application). In one example, the start/stop of an application is indicated by a power preference indication (PPI). Alternatively, the start and stop of using the set of resources could be indicated by UE or eNB explicitly. A MAC CE or RRC message could be used to signaling the preference of using SR to get sync with each other.

Since eNB and UE must be in-sync on the SR usage, multiple SR allocations can be controlled (e.g., activated and/or deactivated) by DRX state transition. Suppose two SR resources SR1 and SR2 are pre-allocated. In one example, DRX ON period can be associated with the first SR allocation SR1 and DRX OFF period can be associated with the other SR allocation SR2. In another example, when in active time, both SR configurations are activated. Once UE enters DRX, the second SR allocation SR2 is automatically deactivated while SR1 is still active. Because SR usage is controlled by predefined events, there is no extra RRC signaling involved.

Comparing to only one SR configuration shared by all applications, application-binding SR configuration could provide more information to the eNB. Associating a specific SR configuration to one or a subset of applications could provide additional information to eNB from the beginning. For example, when receiving an SR indication at a specific resource which is allocated to a delay-tolerant application, eNB then knows that the UL data is not urgent and such information can be used for future scheduling.

Figure 13:
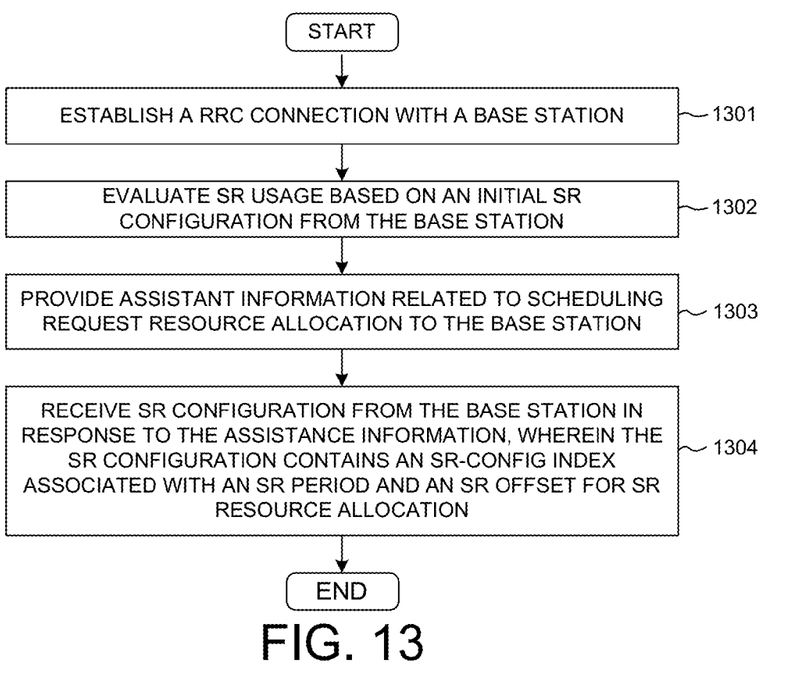
FIG. 13 is a flow chart of a method of providing assistance information for SR resource allocation in accordance with one novel aspect.

FIG. 13 is a flow chart of a method of providing assistance information for SR resource allocation in accordance with one novel aspect. In step 1301, a UE established an RRC connection with a base station. The UE stays in RRC Connected mode. Typically, the UE is configured with an initial SR configuration by the eNB for SR resource allocation. In step 1302, the UE evaluates SR resource utilization and determines whether it needs to send assistant information to the eNB for improving SR resource utilization. If so, then in step 1303, the UE provides assistant information to the eNB. The assistant information is related to the SR resource allocation in PUCCH. In one example, the assistant information comprises a UE-preferred SR configuration index. In another example, the assistant information comprises UE-preferred SR period/offset, and/or traffic pattern information related to packet inter-arrival time (IAT). In step 1304, the UE receives SR configuration from the eNB in response to the assistant information. The SR configuration contains an SR configuration index associated with an SR period and an SR offset for SR resource allocation. Because UE provides assistant information based on considerations including QoS requirement, traffic pattern/statistics, and DRX configuration, eNB is able to allocate SR resources more accurately. UE may further send request message to release SR allocation.

Figure 14:
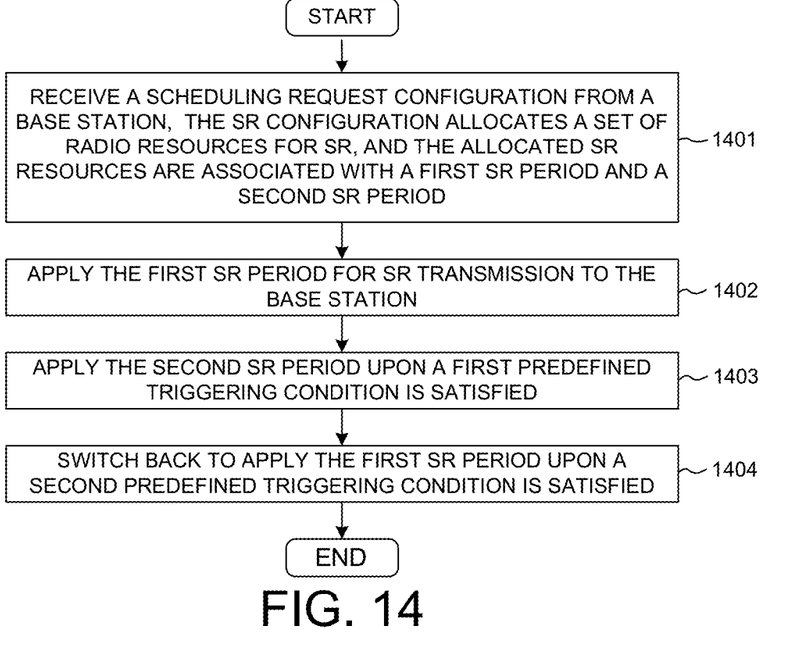
FIG. 14 is a flow chart of a method of applying SR configuration adaptation and SR resource recycling in accordance with one novel aspect.

FIG. 14 is a flow chart of a method of applying SR configuration adaptation and SR resource recycling in accordance with one novel aspect. In step 1401, a UE receives a scheduling request (SR) configuration from a base station. The SR configuration allocates a set of radio resources for SR transmission, the allocated SR resources are associated with a first SR period and a second SR period. In step 1402, the UE applies the first SR period for SR transmission. In step 1403, the UE applies the second SR period for SR transmission upon a first predefined triggering condition is satisfied. In one embodiment, the triggering condition is based on an SR timer that is configured via the SR configuration. In another embodiment, the triggering condition is satisfied when uplink data for a specific application is sent to the base station. The triggering condition may also be based on a discontinuous reception (DRX) operation status. In step 1404, the UE switches back to apply the first SR period upon a second predefined triggering condition is satisfied. The second predefined triggering condition may be the same as or different from the first triggering condition. In one advantage aspect, the first SR period is longer than the second SR period. When the UE applies the second SR period, unused SR resources in PUCCH can be recycled for other UEs or for PUSCH data transmission. By configuring SR resources with different SR periods, SR resource usage is adapted to traffic pattern.

Figure 15:
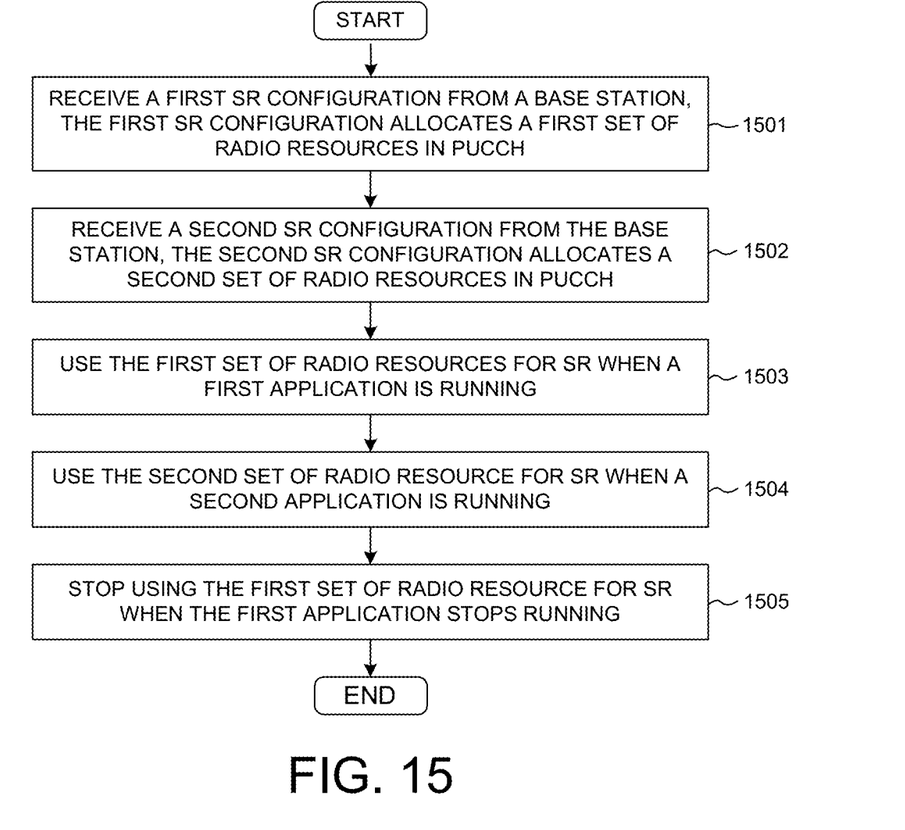
FIG. 15 is a flow chart of a method of configuring multiple SR configurations for predefined applications in accordance with one novel aspect.

FIG. 15 is a flow chart of a method of configuring multiple SR configurations for predefined applications in accordance with one novel aspect. In step 1501, a UE receives a first SR configuration from a base station. The first SR configuration allocates a first set of resources in PUCCH for SR transmission. In step 1502, the UE receives a second SR configuration from the base station. The second SR configuration allocates a second set of resources in PUCCH for SR transmission. In step 1503, the UE uses the first set of SR resources when a first application is running. In step 1504, the UE uses the second set of SR resources when a second application is running. In step 1505, the UE stops using the first set of SR resources when the first application stops running. Each SR configuration is associated with one or more predefined applications. The multiple pre-allocated SR resources are determined to satisfy quality of service (QoS) requirement of the applications. In one embodiment, the allocated SR radio resources are activated or deactivated based on DRX state transition. With multiple pre-allocated SR allocations, SR resource usage is adapted to concerned applications.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    establishing a radio resource control (RRC) connection by a user equipment (UE) with a base station in a mobile communication network;
    providing assistant information related to scheduling request (SR) resource allocation to the base station, wherein the assistant information comprises a UE-preferred SR-CONFIG index; and
    receiving a scheduling request (SR) configuration from the base station in response to the assistant information, wherein the SR configuration associates with an SR period and an SR offset for SR resource allocation.

2. The method of claim 1, wherein the assistant information comprises traffic pattern information related to packet inter-arrival-time (IAT).

3. The method of claim 1, further comprising:
    receiving an initial SR configuration from the base station; and
    evaluating SR usage and determining whether to send the assistant information to the base station.

4. The method of claim 1, further comprising:
    transmitting an indication to the base station to release allocated SR resources.

5. The method of claim 4, wherein the indication contains a specific value of an SR-CONFIG index or contains a specific value of packet inter-arrival time.

6. The method of claim 1, further comprising:
    receiving a second SR configuration from the base station in response to the assistant information, wherein the SR configuration allocates a first set of radio resources, and wherein the second SR configuration allocates a second set of radio resources.

7. The method of claim 6, further comprising:
    using the first set of radio resources for SR when a first application is running; and
    using the second set of radio resources for SR when a second application is running.

8. The method of claim 6, wherein each SR configuration corresponds to a set of predefined applications.

9. A user equipment (UE), comprising:
    a radio resource control (RRC) management module that establishes an RRC connection with a base station in a mobile communication network;
    a scheduling request (SR) adaptation module that provides assistant information related to scheduling request (SR) resource allocation to the base station, wherein the assistant information comprises a UE-preferred SR-CONFIG index; and
    a receiver that receives a scheduling request (SR) configuration from the base station in response to the assistant information, wherein the SR configuration associates with an SR period and an SR offset for SR resource allocation.

10. The UE of claim 9, wherein the assistant information comprises a UE-preferred SR period and a UE-preferred SR offset.

11. The UE of claim 9, wherein the assistant information comprises traffic pattern information related to packet inter-arrival-time (IAT).

12. The UE of claim 9, wherein the UE receives an initial SR configuration from the base station and evaluates an SR usage to determine whether to send the assistant information to the base station.

13. The UE of claim 9, further comprising:
    a transmitter that transmits an indication to the base station to release allocated SR resources.

14. The UE of claim 13, wherein the indication contains a specific value of an SR-CONFIG index or contains a specific value of packet inter-arrival time.

15. The UE of claim 9, wherein the UE receives a second SR configuration from the base station in response to the assistant information, wherein the SR configuration allocates a first set of radio resources, and wherein the second SR configuration allocates a second set of radio resources.

16. The UE of claim 15, wherein the UE uses the first set of radio resources for SR when a first application is running, and wherein the UE uses the second set of radio resources for SR when a second application is running.

17. The UE of claim 15, wherein each SR configuration corresponds to a set of predefined applications.

18. A method, comprising:
    establishing a radio resource control (RRC) connection by a user equipment (UE) with a base station in a mobile communication network;
    providing assistant information related to scheduling request (SR) resource allocation to the base station, wherein the assistant information comprises a UE-preferred SR period and a UE-preferred SR offset; and
    receiving a scheduling request (SR) configuration from the base station in response to the assistant information, wherein the SR configuration associates with an SR period and an SR offset for SR resource allocation.

19. The method of claim 18, further comprising:
    receiving an initial SR configuration from the base station; and
    evaluating SR usage and determining whether to send the assistant information to the base station.

20. The method of claim 18, further comprising:
    receiving a second SR configuration from the base station in response to the assistant information, wherein the SR configuration allocates a first set of radio resources, and wherein the second SR configuration allocates a second set of radio resources.

* * * * *